United States Patent
Kuo et al.

(10) Patent No.: US 9,898,946 B2
(45) Date of Patent: Feb. 20, 2018

(54) MAGNETIC SCANNING DEVICE AND METHOD FOR IMAGE GENERATION

(71) Applicant: HON HAI PRECISION INDUSTRY CO., LTD., New Taipei (TW)

(72) Inventors: Chin-Pin Kuo, New Taipei (TW);
Tung-Tso Tsai, New Taipei (TW);
Tsung-Yuan Tu, New Taipei (TW);
Yu-Cheng Chen, New Taipei (TW);
I-Hua Chen, New Taipei (TW);
Chun-Chang Chang, New Taipei (TW); Shuo-Yen Chung, New Taipei (TW); Chien-Tsung Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 33 days.

(21) Appl. No.: 15/069,224

(22) Filed: Mar. 14, 2016

(65) Prior Publication Data

US 2017/0092170 A1 Mar. 30, 2017

(30) Foreign Application Priority Data

Sep. 25, 2015 (TW) .............................. 104131897 A

(51) Int. Cl.
G09G 1/14 (2006.01)
G09G 3/00 (2006.01)
G06F 3/14 (2006.01)
G09G 3/34 (2006.01)

(52) U.S. Cl.
CPC .............. G09G 3/008 (2013.01); G06F 3/14 (2013.01); G09G 3/3486 (2013.01); G09G 2340/0407 (2013.01)

(58) Field of Classification Search
CPC ...... G02F 2001/094; G02F 1/09; G02F 1/091; G02F 2001/1676; G09F 9/375; Y10T 428/325; G09G 2310/02; G09G 3/344
See application file for complete search history.

(56) References Cited

U.S. PATENT DOCUMENTS 6,498,597 B1 * 12/2002 Sawano ................... G09F 11/29
345/107
2008/0303779 A1 * 12/2008 Machida .............. G09G 3/3446
345/107

FOREIGN PATENT DOCUMENTS

CN 1383202 A 12/2002

* cited by examiner

*Primary Examiner* — Hau Nguyen
(74) *Attorney, Agent, or Firm* — ScienBiziP, P.C.

(57) ABSTRACT

A magnetic scanning method includes acquiring an image from a storage device of a magnetic scanning device, controlling a magnetic read-write head of the magnetic scanning device to touch a reference point on a plane, generating an electric signal which reflects relevant information of the acquired image, inputting the electric signal reflecting the relevant information of the acquired image to the magnetic read-write head, when the electric signal reflecting the relevant information of the acquired image flows through the magnetic read-write head, controlling the magnetic read-write head to generate a magnetic field corresponding to the electric signal, controlling the magnetic read-write head to move and scan the plane from the reference point, to magnetize the magnetic powder on the plane by the magnetic field, and driving the magnetic powder to move relatively to generate an image similar to the acquired image.

10 Claims, 4 Drawing Sheets

MAGNETIC SCANNING DEVICE AND METHOD FOR IMAGE GENERATION

CROSS-REFERENCE TO RELATED APPLICATIONS

This application claims priority to Taiwanese Patent Application No. 104131897 filed on Sep. 25, 2015, the contents of which are incorporated by reference herein.

FIELD

The subject matter herein generally relates to scanning technology, and particularly to a magnetic scanning device and method for generating an image.

BACKGROUND

Nowadays, intelligent terminal devices like smart phones, tablet computers etc. are widely used, protective shells with various printed images are used to protect and beautify the intelligent terminal devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
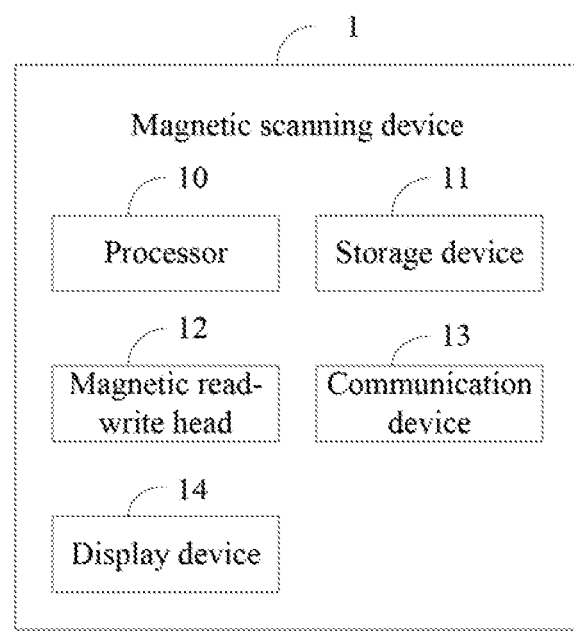
FIG. 1 is a block diagram of a magnetic scanning device for generating an image of one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "comprising" means "including, but not necessarily limited to"; it specifically indicates open-ended inclusion or membership in a so-described combination, group, series and the like.

Figure 2:
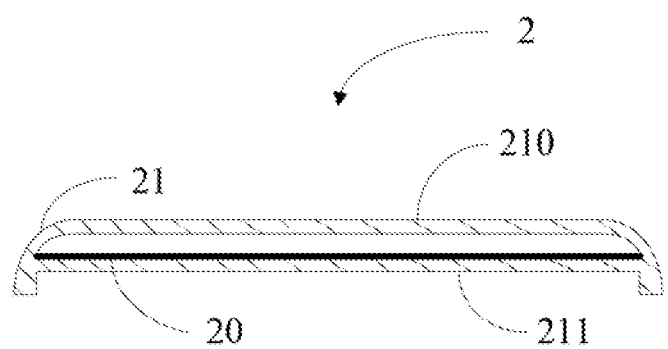
FIG. 2 is a diagrammatic view illustrating an embodiment of a cross section of a protective shell.

FIG. 1 illustrates a magnetic scanning device 1 for generating an image. As illustrated in FIG. 2, in the illustrated embodiment, the magnetic scanning device 1 is used for scanning an image to a protective shell 2 which has magnetic powder 20. In the illustrated embodiment, the protective shell 2 is applied to portable electronic devices such as smart phones, tablet computers etc. In other embodiments, the magnetic scanning device 1 can scan the image to any other plane having the magnetic powder 20.

The magnetic scanning device 1 includes, but is not limited to, a processor 10, a storage device 11, a magnetic read-write head 12, a communication device 13, and a display device 14. The storage device 11 stores at least one image. The communication device 13 can connect to a memory, an electronic device, or a cloud server. In the illustrated embodiment, the communication device 13 can be a USB interface, a Wireless Fidelity (WIFI) module, a BLUETOOTH module, or a Subscriber Identity Module (SIM) card, the memory can be a memory card or a hard disk, and the electronic device can be a smart phone or a personal computer.

In the illustrated embodiment, the storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The processor 10 can be a central processing unit (CPU), a microprocessor, or other data processor chip that performs functions of the magnetic scanning device 1.

The display device 14 displays operation settings for a user to operate and scan information. In the illustrated embodiment, the display device 14 can be a touch display screen. The operation settings can include, but is not limited to, an option of "start scanning" and an option of "finish scanning", the user can press one of the options on the touch display screen, and the magnetic scanning device 1 can execute a corresponding operation. The scanning information can include, but is not limited to, a resolution of an image to be scanned and a current scanning state, the current scanning state shows a scanning process of the magnetic scanning device 1.

Figure 3:
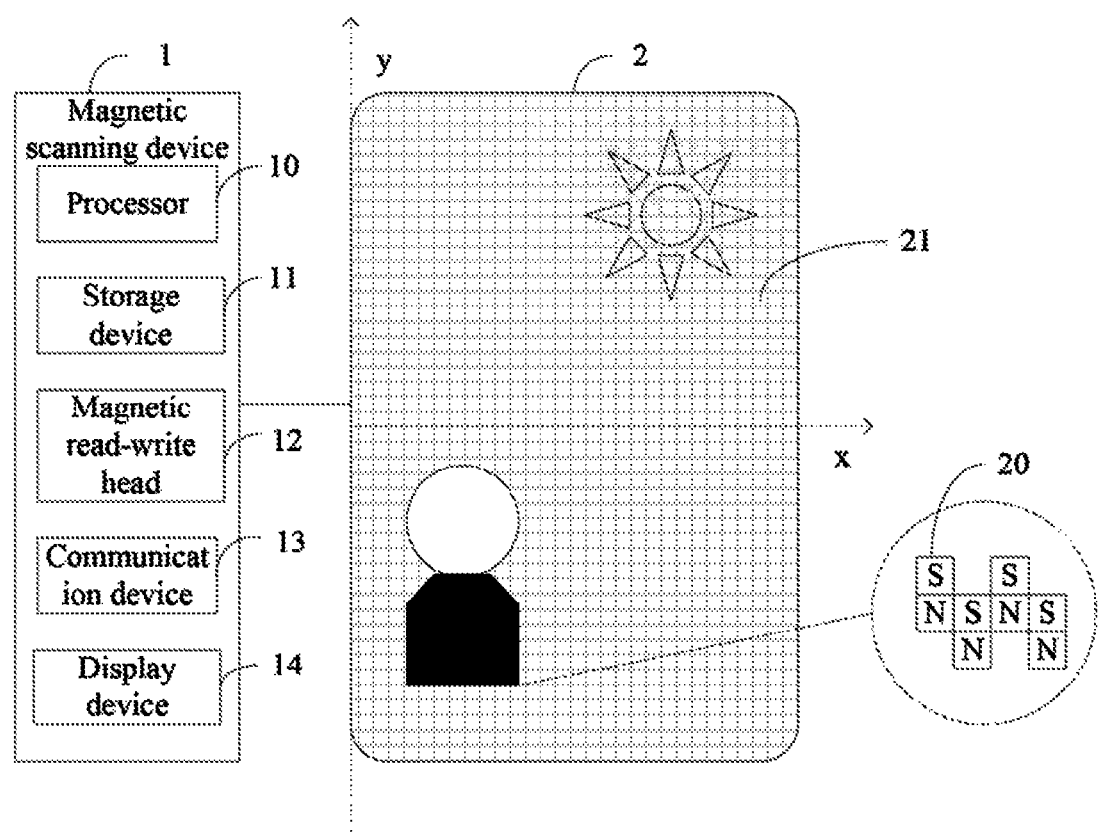
FIG. 3. is a diagrammatic view illustrating an embodiment of a plane of the protective shell.

As illustrated in FIG. 3, the magnetic scanning device 1 scans the image to a plane 21 of the protective shell 2 having the magnetic powder 20. The plane 21 includes a number of coordinate points, the magnetic scanning device 1 records a position of each coordinate point on the plane 21. The plane 21 sets a sensor on at least one coordinate point.

In the illustrated embodiment, each coordinate point on the plane 21 corresponds to one of coordinates in a rectangular coordinate system. The plane 21 is rectangular, and includes a left side, a right side, an upside, and a downside. A midpoint on the left side of the plane 21 is taken as an origin of the coordinate system, x-axis of the coordinate system goes through the midpoint on the left side and runs substantially parallel with the upside of the plane 21, y-axis is a line which is along the left side, thus, the magnetic scanning device 1 can record the position of each coordinate point on the plane 21 by forming a coordinate value according to the coordinate system. In the illustrated embodiment, the coordinate system is used for illustrating the position of each coordinate point on the plane 21, the plane 21 does not include the x-axis, the y-axis, the origin of the coordinate system. In other embodiments, the position of the x-axis, the y-axis, the origin of the coordinate system can be other positions.

As illustrated in FIG. 2, the plane 21 includes a upper surface 210 and a lower surface 211, and a gap is formed between the upper surface 210 and the lower surface 211. In the illustrated embodiment, the upper surface 210 is transparent, the coordinate points are set on the upper surface 210. The magnetic powder 20 is distributed at a position corresponding to each coordinate point on the lower surface 211. When the magnetic scanning device 1 does not scan the image, the magnetic powder 20 is demagnetized and cannot generate the image on the plane 21.

In at least one embodiment, the storage device 11 stores a number of instructions, when the instructions are executed by the at least one processor 10, the instructions cause the at least one processor 10 to implement corresponding functions.

When the communication device 13 is connected to the memory, the electronic device, or the cloud server, the processor 10 acquires images from the memory, the electronic device, or the cloud server, and stores the acquired images into the storage device 11. In the illustrated embodiment, when the communication device 13 is connected to the memory by a data line, the processor 10 can store the images pre-stored in the memory to the storage device 11. In other embodiments, when the communication device 13 is connected to the electronic device by WIFI, BLUETOOTH, or the data line, the user can select one or more images on the electronic device, the processor 10 can store the one or more images in the electronic device to the storage device 11. In yet other embodiments, when the communication device 13 connects to the cloud server by WIFI or Internet, the processor 10 can download images from the cloud server, and store the downloaded images into the storage device 11.

The processor 10 further acquires an image from the storage device 11. In the illustrated embodiment, the processor 10 can display the images stored in the storage device 11 on the display device 14, the user can select one of the images by touching the display device 14, the processor 10 acquires the selected image in response to the selection of the user.

The processor 10 checks whether each pixel of the acquired image corresponds to a coordinate point on the plane 21, if each pixel of the acquired image cannot correspond to a coordinate point on the plane 21, the processor 10 changes the resolution of the acquired image, and makes each pixel of the acquired image correspond to a coordinate point on the plane 21. For example, the processor 10 changes a number of transverse pixels or a number of vertical pixels of the acquired image so as to change the resolution of the acquired image.

The processor 10 further checks whether the number of transverse pixels of the acquired image is greater than the number of coordinate points on the upside of the plane 21, if the number of transverse pixels of the acquired image is greater than the number of coordinate points on the upside of the plane 21, the processor 10 decreases the number of transverse pixels of the acquired image, and enables the number of transverse pixels to be less than or equal to the number of coordinate points on the upside of the plane 21. The processor 10 further checks whether the number of vertical pixels of the acquired image is greater than the number of coordinate points on the left side of the plane 21, if the number of vertical pixels of the acquired image is greater than the number of coordinate points on the left side of the plane 21, the processor 10 decreases the number of vertical pixels of the acquired image, and enables the number of vertical pixels to be less than or equal to the number of coordinate points on the left side of the plane 21.

In other embodiments, the user also can preprocess the resolution of the images stored in the memory, the electronic device, or the cloud server, and make each pixel of an image correspond to a coordinate point on the plane 21.

When the plane 21 is placed on the magnetic scanning device 1, the processor 10 further controls the magnetic read-write head 12 to touch a reference point on the plane 21. The user can place the plane 21 on the magnetic scanning device 1, and touch the "start scanning" option displayed on the display device 14, the processor 10 controls the magnetic read-write head 12 to move until detecting a sensor, the processor 10 further controls the magnetic read-write head 12 to touch a position located by the sensor, at this time, the coordinate point corresponding to the position is taken as the reference point.

In the illustrated embodiment, the reference point is one of the coordinate points which is located at a four vertex position of the plane 21, the sensor is set on the coordinate point corresponding to the reference point, the magnetic read-write head 12 scans the plane 21 from the reference point. In other embodiments, the sensor is set on each of the four coordinate points corresponding to the four vertex position, thus, each of the four coordinate points is taken as reference point, the processor 10 can control the magnetic read-write head 12 to touch any reference point.

The processor 10 further generates an electric signal which reflects the relevant information of the acquired image according to the acquired image, and inputs the electric signal reflecting the relevant information of the acquired image to the magnetic read-write head 12. In the illustrated embodiment, the relevant information of the acquired image includes, but is not limited to, a pixel value and position information of each pixel.

When the electric signal reflecting the relevant information of the acquired image flows through the magnetic read-write head 12, the processor 10 further controls the magnetic read-write head 12 to generate a magnetic field corresponding to the electric signal. In the illustrated embodiment, the magnetic field is generated based on the electric signal reflecting the relevant information of the acquired image, thus the magnetic field can also reflect the relevant information of the acquired image.

The processor 10 further controls the magnetic read-write head 12 to move and scan the plane 21 from the reference point, to magnetize the magnetic powder 20 on the plane 21 by the magnetic field, and drive the magnetic powder 20 to move relatively to generate an image similar to the acquired image. When the magnetic read-write head 12 scans the plane 21 at a uniform velocity, the magnetic powder 20 is magnetized, thus the magnetic powder 20 can attract mutually and gather, and further adhere on the upper surface 210 of the plane 21.

Furthermore, because the magnetic field generated by the magnetic read-write head 12 reflects the relevant information of the acquired image, and each pixel of the acquired image corresponds to a coordinate point on the plane 21, starting with the pixel corresponding to the reference point on the plane 21, all of the pixels of the acquired image are scanned to the plane 21 in sequence.

For example, if the acquired image is black and white, and the magnetic powder 20 is black, the magnetic powder 20 can gather at the position of the coordinate points corresponding to the pixels with pixel value #000000 of the acquired image, that is, the magnetic powder 20 gathers at the position of the coordinate points corresponding to the black pixels of the acquired image. Accordingly, no magnetic powder 20 or only a bit of magnetic powder 20 gathers at the position of the coordinate points corresponding to the pixels with pixel value #FFFFFF of the acquired image, that is, no magnetic powder 20 or only a bit of magnetic powder 20 gathers at the coordinate points corresponding to the white pixels of the acquired image. Thus, the distribution of the magnetic powder 20 on the plane 21 is roughly the same as the distribution of the black pixels in the acquired image, and the magnetic powder 20 can generate the image similar to the acquired image. Because the upper surface 210 of the plane 21 is transparent, the user can see the generated image through the upper surface 210. When the magnetic read-write head 12 finishes scanning the plane 21, the processor 10 controls the magnetic read-write head 12 to be away from the plane 21, the magnetic powder 20 can carry residual magnetism and still keep the image similar to the acquired image.

In another embodiment, the magnetic scanning device 1 can include a support portion which is used for supporting the plane 21, the bearing portion aligns with the magnetic read-write head 12. The processor 10 controls the bearing portion to move at the uniform velocity, thus the magnetic read-write head 12 can also scan the plane 21.

The processor 10 further erases the generated image on the plane 21. In the illustrated embodiment, the processor 10 further controls the magnetic read-write head 12 to scan the plane 21 and enables the magnetic powder 20 to demagnetize. The demagnetized magnetic powder 20 cannot gather and adhere on the upper surface 210 of the plane 21, thus, the generated image on the plane 21 is erased.

Figure 4:
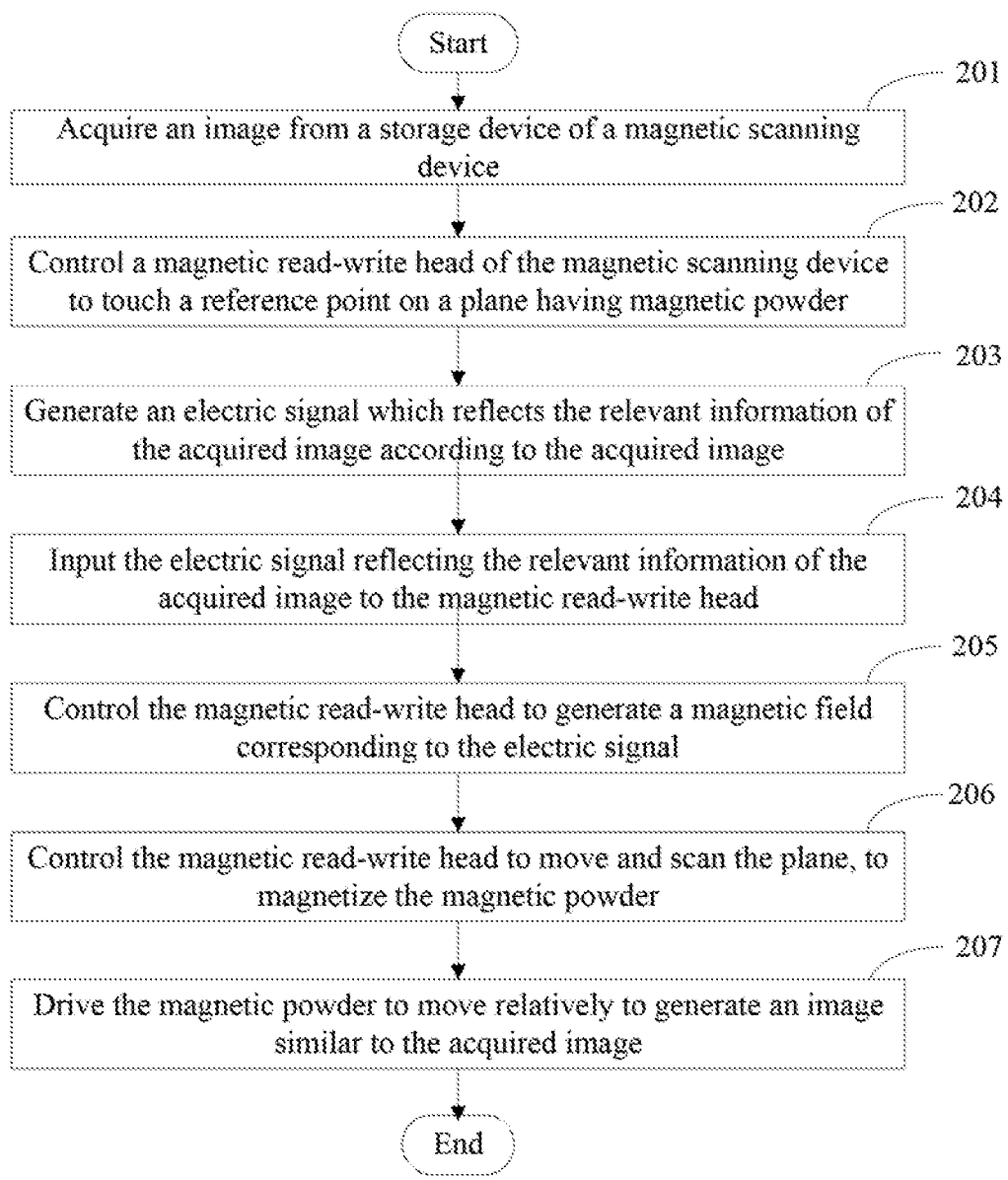
FIG. 4 illustrates a flowchart of an embodiment of a magnetic scanning method.

FIG. 4 illustrates a flowchart of an embodiment of a magnetic scanning method. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, at least one order of blocks is by example only and the order of the blocks can be changed. Additional blocks may be added or fewer blocks may be utilized, without departing from this disclosure. The example method can begin at block 201.

At block 201, a processor acquires an image from a storage device of a magnetic scanning device.

At block 202, when a plane is placed on the magnetic scanning device, the processor further controls a magnetic read-write head of the magnetic scanning device to touch a reference point on the plane.

At block 203, the processor further generates an electric signal which reflects the relevant information of the acquired image according to the acquired image.

At block 204, the processor further inputs the electric signal reflecting the relevant information of the acquired image to the magnetic read-write head.

At block 205, when the electric signal reflecting the relevant information of the acquired image flows through the magnetic read-write head, the processor further controls the magnetic read-write head to generate a magnetic field corresponding to the electric signal.

At block 206, the processor further controls the magnetic read-write head to move and scan the plane from the reference point, to magnetize magnetic powder on the plane by the magnetic field.

At block 207, the processor further controls the magnetic read-write head to drive the magnetic powder to move relatively to generate an image similar to the acquired image.

The method further includes: the processor acquiring images from a memory, an electronic device, or a cloud server when a communication device is connected to the memory, the electronic device, or the cloud server, and storing the acquired images into the storage device.

The method further includes: the processor checking whether each pixel of the acquired image corresponds to a coordinate point on the plane, if each pixel of the acquired image cannot correspond to a coordinate point on the plane, the processor changing the resolution of the acquired image and making each pixel of the acquired image correspond to a coordinate point on the plane.

The method further includes: the processor erasing the generated image on the plane.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A magnetic scanning device for generating an image on a plane having magnetic powder, the device comprising:
   a magnetic read-write head;
   at least one processor; and
   a storage device coupled to the at least one processor and configured to store at least one image and a plurality of instructions for execution by the processor to cause the at least one processor to:
   acquire an image from the storage device;
   control, when the plane is placed on the magnetic scanning device, the magnetic read-write head to touch a reference point on the plane;
   generate an electric signal which reflects relevant information of the acquired image according to the acquired image;
   input the electric signal reflecting the relevant information of the acquired image to the magnetic read-write head;
   control, when the electric signal reflecting the relevant information of the acquired image flows through the magnetic read-write head, the magnetic read-write head to generate a magnetic field corresponding to the electric signal;
   control the magnetic read-write head to move and scan the plane from the reference point, to magnetize the magnetic powder on the plane by the magnetic field;
   drive the magnetic powder to move relatively to generate an image similar to the acquired image;
   check whether each pixel of the acquired image corresponds to a coordinate point on the plane; and
   change, if each pixel of the acquired image does not correspond to a coordinate point on the plane, the resolution of the acquired image and make each pixel of the acquired image correspond to a coordinate point on the plane.

2. The magnetic scanning device according to claim 1, wherein the reference point is a coordinate point where sets a sensor on the plane, the at least one processor is caused to:

control, when the magnetic read-write head detects the sensor, the magnetic read-write head to touch a position where the sensor locates.

3. The magnetic scanning device according to claim 1, wherein the at least one processor is further caused to:
    erase the generated image on the plane.

4. The magnetic scanning device according to claim 1, further comprising:
    a display device configured to display operation settings and scanning information.

5. The magnetic scanning device according to claim 1, further comprising:
    a communication device configured to connect to a memory, an electronic device, or a cloud server.

6. The magnetic scanning device according to claim 5, wherein the at least one processor is further caused to:
    acquire images from the memory, the electronic device, or the cloud server; and
    store the acquired images into the storage device.

7. A magnetic scanning method comprising:
    acquiring an image from a storage device of a magnetic scanning device;
    controlling a magnetic read-write head of the magnetic scanning device to touch a reference point on a plane having magnetic powder when the plane is placed on the magnetic scanning device;
    generating an electric signal which reflects relevant information of the acquired image according to the acquired image;
    inputting the electric signal reflecting the relevant information of the acquired image to the magnetic read-write head;
    controlling the magnetic read-write head to generate a magnetic field corresponding to the electric signal, when the electric signal reflecting the relevant information of the acquired image flows through the magnetic read-write head;
    controlling the magnetic read-write head to move and scan the plane from the reference point, to magnetize the magnetic powder on the plane by the magnetic field;
    driving the magnetic powder to move relatively to generate an image similar to the acquired image;
    checking whether each pixel of the acquired image corresponds to a coordinate point on the plane; and
    if each pixel of the acquired image does not correspond to a coordinate point on the plane, changing the resolution of the acquired image and making each pixel of the acquired image correspond to a coordinate point on the plane.

8. The magnetic scanning method according to claim 7, further comprising:
    controlling the magnetic read-write head to touch a position where a sensor locates when the magnetic read-write head detects the sensor.

9. The magnetic scanning method according to claim 7, further comprising:
    erasing the generated image on the plane.

10. The magnetic scanning method according to claim 7, further comprising:
    acquiring images from a memory, an electronic device, or a cloud server when a communication device is connected to the memory, the electronic device, or the cloud server; and storing the acquired images into the storage device.

* * * * *